Nov. 28, 1944.  A. G. MAHURIN  2,363,799
POTENTIAL INDICATOR
Filed Oct. 12, 1943
Fig. 1
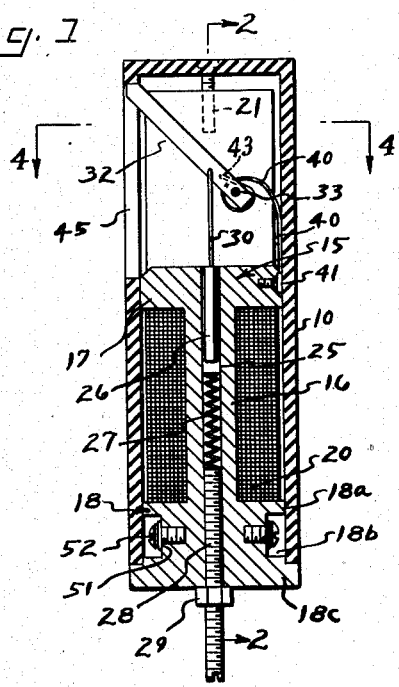
Fig. 2
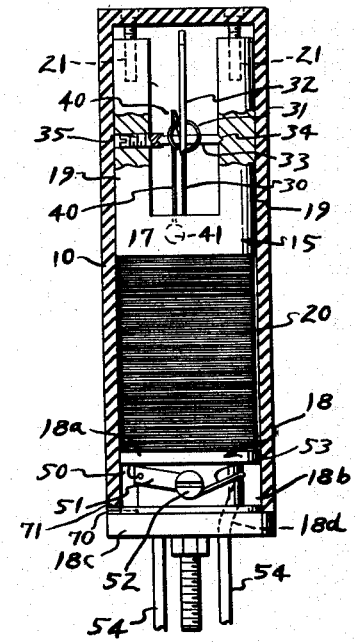
Fig. 5
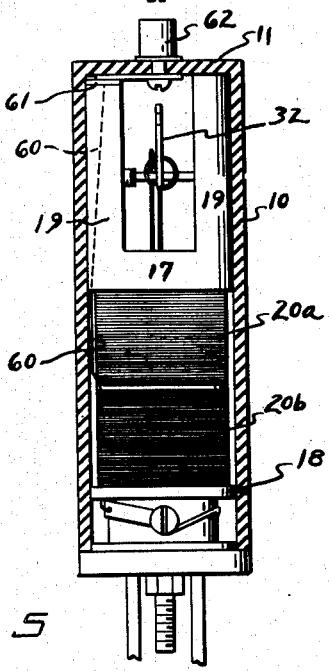
Fig. 3
| DC | AC |
|---|---|
| 125 | 110 |
| 250 | 220 |
| 600 | 440 |
Fig. 4
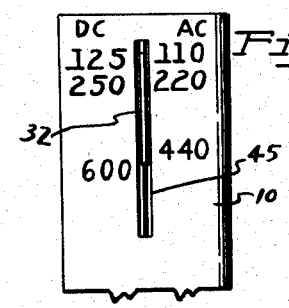
Inventor
Allen G. Mahurin
By Bakelow & Scawtle Cury
Attys.

Patented Nov. 28, 1944

2,363,799

UNITED STATES PATENT OFFICE 2,363,799

POTENTIAL INDICATOR

Allen G. Mahurin, Seal Beach, Calif.

Application October 12, 1943, Serial No. 505,995

3 Claims. (Cl. 171—95)

This invention has to do with instruments for indicating and/or testing potentials. A potential indicator of small bulk and simple structure is desirable for purposes of voltage testing in situations where no great accuracy is necessary. Such an instrument should be capable of use on either alternating or direct current lines and should be capable of indicating a wide range of voltages.

Attempts have been made in the past to supply an instrument of the character noted, but they have been deficient in one or more of the qualities desirable in such an instrument. Those qualities are, generally speaking, maximum simplicity in design, low cost of manufacture, reliability in use, and ruggedness against being thrown out of order or otherwise injured due to accidents, misuse or abuse. These qualities, coupled with minimum weight and bulk are the general objectives which my invention reaches, and those objects and the manners in which they and others are reached, will best appear from the following detailed description of preferred structures illustrative of the invention, shown in the accompanying drawing in which:

Fig. 1 is a vertical longitudinal section of one form of my instrument;

Fig. 2 is a section taken as indicated by line 2—2 on Fig. 1, with certain parts shown in elevation;

Fig. 3 is a fragmentary side elevation taken as indicated by line 3—3 on Fig. 1;

Fig. 4 is a cross section on line 4—4 of Fig. 1; and

Fig. 5 is a section similar to that of Fig. 2 but showing a somewhat modified structure.

In the drawing the instrument is shown as housed in a cylindric casing 10, one end of which may be closed by an end wall 11 which may be formed integrally with the cylindric wall. Casing end 11 may, as will be obvious, be either in the form of a removable cap or plug; but I prefer to form it integrally with the cylindric side wall. The casing, as well as certain interior parts of the instrument may be made of any suitable material, but preferably of some insulating material, and preferably also of some material which is of low density so that the whole instrument is of relatively light weight. For instance the external casing may be of some fibrous material and the major portion of the interior structure, to be described, may be of wood. It is preferred however to form all such parts of some suitable molded plastic.

Within the casing, fitting it snugly but with easy removability, there is a member which as a whole I may term the mounting core of the instrument. This mounting core, indicated generally by the numeral 15, is made up principally of a central sleeve 16 with upper and lower heads 17 and 18 at its ends, and of two spaced extensions 19 which project upwardly from upper head 17 to the upper or closed end of the casing. All of these major parts of the mounting core are unitary and preferably made in one integral piece and preferably, as noted above, of some molded material such as a plastic. The central sleeve 16 and the two heads 17 and 18 form the spool for either the single coil 20 shown in Figs. 1 and 2 or the multiple coils 20a, 20b, shown in Fig. 5. The lower head 18 has an upper flanged portion 18a which directly forms the winding spool head; then immediately below flange 18a it has an annularly recessed or reduced portion 18b which provides space between it and cylindric wall 10 for the wire connections, and then below portion 18b it has an enlarged flanged head portion 18c which fits the otherwise open end of casing 10 to act as a closure for that end. A registration pin 70, mounted in head 18c, fits into a notch 71 in case 10, to register the mounting core in its proper position so that pointer 32 will register with casing slot 45 when the parts are assembled.

When the described mounting core is inserted in the casing, its length is such that when the closure head 18c engages the open end of the casing, the upper ends of extensions 19 are substantially in contact with or close to the upper casing head 11. A pair of screws such as indicated at 21 pass through head 11 and thread into openings in extensions 19 to hold the mounting core in place.

Spool sleeve 16 has a longitudinal bore 25 which extends through it and the two heads 17 and 18. This bore accommodates a small solenoid core 26 whose normal position is in the upper end of the bore as shown in Fig. 1. The bore also accommodates a light coiled spring 27 under core 26 and resting at its lower end upon an adjustment screw 28 which is threaded into the lower end of bore 25. By adjusting screw 28 and setting it with the lock nut 29, the position of spring 27 with relation to armature core 26 may be adjusted and set.

A small connecting rod or wire 30 extends upwardly from the upper end of armature core 26 and is looped, at is upper end at 31, through a hole in a light thin pointer 32. Pointer 32 is preferably thin and flat as illustrated and is made preferably of some light thin sheet metal. It is mounted at its pivoted end on a pivot spindle 33 which extends transversely across the space between the two upper extensions 19 and is pivotally supported between those two extensions. For instance one of the extensions 19 may have a countersunk pivot bore or depression 34 in its inner face, and the other extension 19 may be provided with an adjustable pivot screw 35 which has a countersunk end, the pivot spindle being pivotally held between 34 and 35.

A light hair spring 40 has one end (its lower end) secured by a small screw or other similar simple fastening member 41 to upper head 17. The hair spring 40 takes one complete turn loosely about spindle 33 and has its other upper end secured to the pointer 32 as at 43. Spring 40 is so formed and so attached that its spring tension will substantially just support the weight of core 26, wire 30, and pointer 32 in the relative normal position shown in Fig. 1 with core 26 at the upper end of bore 25 and with the outer end of pointer 32 at the upper end of casing slot 45 and preferably exerting a slight pressure upwardly against the end of the slot. Core 26 although of iron or some similar magnetic permeable material, is quite light. The drawings show the whole instrument in an actual size which is practical. Pointer 32 is also very light, being quite thin (its thickness is somewhat exaggerated in the drawing) and it also can be made of some light metal such as aluminum or an alloy. Hair spring 40 need not be very strong in order to support the weight of the mentioned parts; and if the hair spring supports the parts so that the outer end of pointer 32 presses upwardly with a slight pressure against the upper end of slot 45, a fairly considerable jar or blow on the instrument will not move the pointer downwardly even though the hair spring is quite delicate and the movement of the parts under electromagnetic forces is also quite delicate. The pointer plays in the vertical casing slot 45, moving downwardly in the slot to or toward its lower end. In its uppermost normal position the end of the pointer is preferably completely recessed in the slot where it is not liable to be accidentally engaged by any external object which might force it or injure it. These arrangements and proportionings of the parts provide an instrument which is quite delicate in its operations, but at the same time is quite fully proof against injury when the instrument is loosely carried in a pocket or even when it is subjected to accidents or abuse. And the pointer 32, besides being in a protected position normally, is also of such length that in its downward swinging motion it projects little, if any, outward beyond the defining edges of slot 45.

Hair spring 40 is, as mentioned above, quite delicate. In practice it is formed into a coil of about the proportions and dimensions shown in the drawings and is made of steel spring wire 0.009 inch diameter. When the instrument is in use the current which flows through coil 20 sets up a magneto-motive force which increases for higher voltages and thus tends to draw core 26 further downwardly against the tension of hair spring 40. The tension of the delicate hair spring 40 does not increase very fast as pointer 32 is moved downwardly. In order to provide an instrument which is capable of being used over a wide range of voltages within a reasonably short movement of the pointer, and at the same time to provide for the delicacy of pointer movement which is essential to accurate indications of the lower voltages, I employ in combination with the delicate hair spring the reenforcing spring 27 below core 26. This reenforcing spring, although also relatively light, is stronger in spring tension than the hair spring. To give an illustration of a desirable spring strength in the specific instrument which I am describing here, I may say that spring 27 is about ⅛″ in diameter, three-quarters inch long and composed of about twenty coils of 0.009 inch steel spring wire. It is adjustable by screw 28 so as to adjust the position at which core 26 comes into contact with it. And by proper adjustment of spring 27 and with the coil winding which will be specified, the throw of pointer 32 under different potentials corresponds to the A. C. and D. C. indications which are shown in Fig. 3 on the outside of the case alongside the opposite edges of slot 45. The approximate range of potentials which the specifically described instrument will indicate and measure is illustrated by the range of the scale figures.

For an instrument of the size and proportions and voltage ranges shown, coil 20 is for instance wound with No. 40 enameled copper wire, total coil resistance (D. C.) being about 3000 ohms. The ends of the coil winding come out, as is shown for one of the ends in Fig. 2, at 50 and are secured to contact strips 51 which in turn are secured to the recessed head portion 18b by binding screws 52. Binding screws 52 also secure the ends 53 of the two flexible lead-in wires 54, the wires passing through head portions 18c and 18b through bores which are indicated (one of them) at 18d. Externally of the instrument case the flexible cords 54 may be suitably supported and protected against breakage at their entrance to the bores by any suitable or known means, unnecessary to illustrate here. The cords may be of any suitable length and equipped at their ends with any suitable contact pieces and insulating handles.

Fig. 5 shows a slight modification which may be used to give the instrument a still wider range of operation. Insofar as applicable, the numerals applied to Figs. 1 to 4 are applied to the same parts in Fig. 5. The structures are the same, except for the features now to be noted.

Coil 20 of Fig. 1 is replaced by two half-coils 20a and 20b as illustrated. The beginning end of one coil and the opposite end of the other are connected to the two cords 54, and the two other ends are connected together to a common middle lead 60; so that current will flow between cords 54 through the two coils in series in the same winding direction. When the two cords are connected across a circuit the two half-coils together act like single coil 20. Middle lead 60 extends up through head 17 and one extension 19 to a contact plate 61 on the upper end of that extension. When the mounting core is placed in the case, contact 61 engages a contact strip 62 which is secured to the under side of case head 11. A binding post 62 mounted on head 11 provides means for connecting a cord like cords 54. For smaller voltage ranges one uses the connection at 62, and the one of cords 54 which connects with the upper coil 20a. That cord may be distinctively colored for identification. Springs 40 and 27 may be, in this type of instrument, made weaker than in Fig. 1, or spring 27 may be merely located lower down. The pointer will then move further down in slot 45 for any given voltage applied to the whole winding. The higher voltages, such as those indicated in Fig. 3, are applied to the half-winding and move the pointer over a calibrated scale such as that shown in Fig. 3. Voltages lower than those indicated are applied to the whole winding and additional scale indications may be provided on the case to indicate those voltages.

Although I have described my instrument as a potential indicator, although that is the use for which it is most practical, it will be readily recognized that an instrument of the same structure and functioning may be used for other electrical measurements, such as current measurement or indication, by utilizing suitable coil windings.

I claim:

1. An electrical measuring instrument of the type which comprises a slotted exterior case, a solenoid with a longitudinally movable armature core therein and a movable pointer connected with the core; characterized by the provision of a unitary mounting core which comprises a coil spool with two end heads and a central longitudinal sleeve containing the movable core, and laterally spaced longitudinal projections extending from one of said spool heads; the pointer being movably supported on and between the two longitudinal extensions to move in a longitudinal plane; the case comprising a tubular side wall and one end closure, and the unitary mounting core being removably arranged in the case with one of the spool heads closing the other end of the case.

2. An electrical measuring instrument of the type which comprises a slotted exterior case, a solenoid with a longitudinally movable armature core therein and a movable pointer connected with the core; characterized by the provision of a unitary mounting core which comprises a coil spool with two end heads and a central longitudinal sleeve containing the movable core, and laterally spaced longitudinal projections extending from one of said spool heads; the pointer being movably supported on and between the two longitudinal extensions to move in a longitudinal plane; the case comprising a tubular side wall and one end closure, and the unitary mounting core being removably arranged in the case with one of the spool heads closing the other end of the case, with the mounting core projections extending to the vicinity of the case head, and securing means for the mounting core projecting through the case head and extending into a mounting core projection.

3. An electrical measuring instrument as specified in claim 1; further characterized by the pointer mounting being in the form of a pivot shaft extending between the two mounting core extensions on a transverse axis.

ALLEN G. MAHURIN.